(No Model.) 2 Sheets—Sheet 1.
J. ERNY.
REFRIGERATING APPARATUS.
No. 462,118. Patented Oct. 27, 1891.
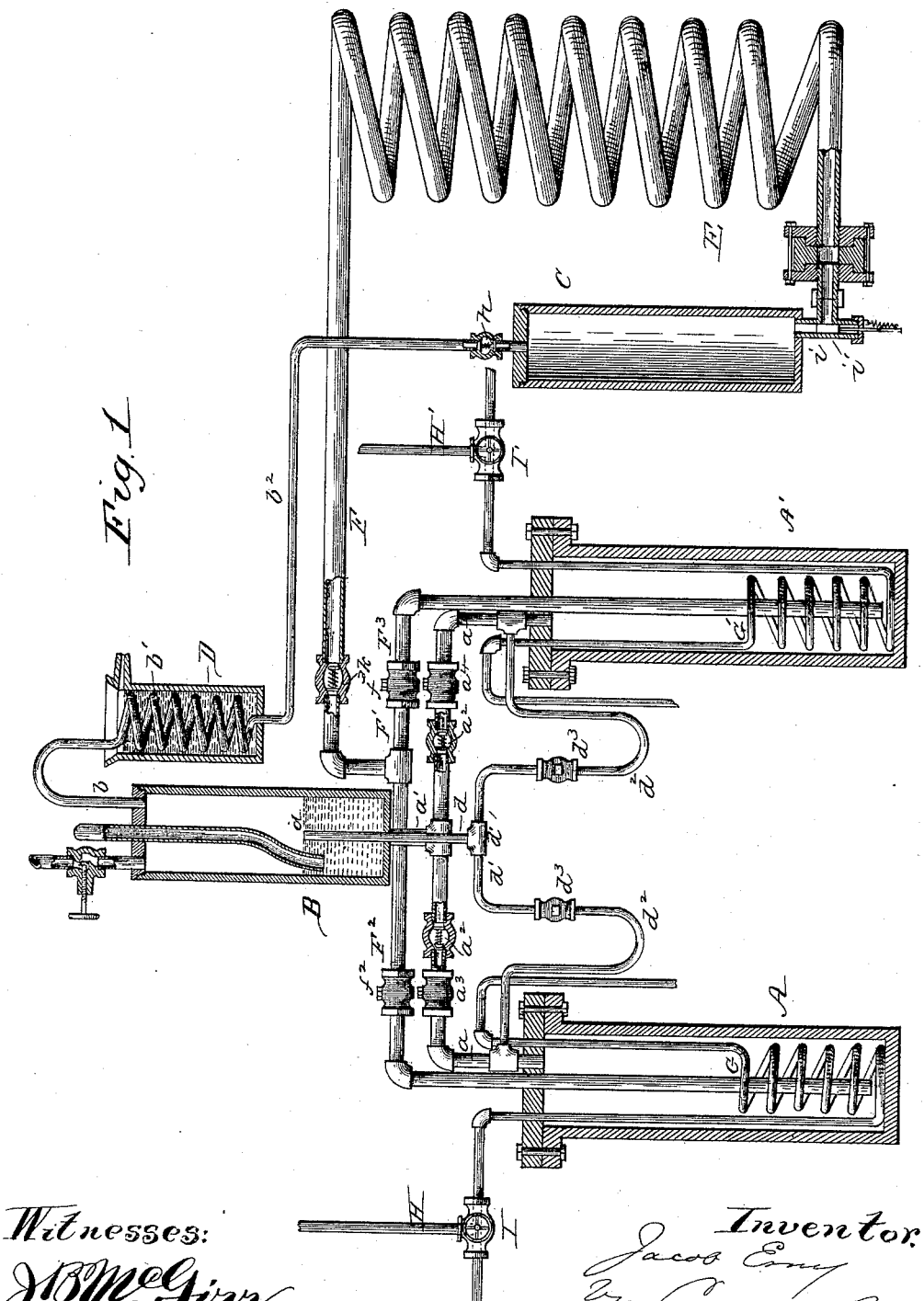

(No Model.) 2 Sheets—Sheet 2.
J. ERNY.
REFRIGERATING APPARATUS.
No. 462,118. Patented Oct. 27, 1891.
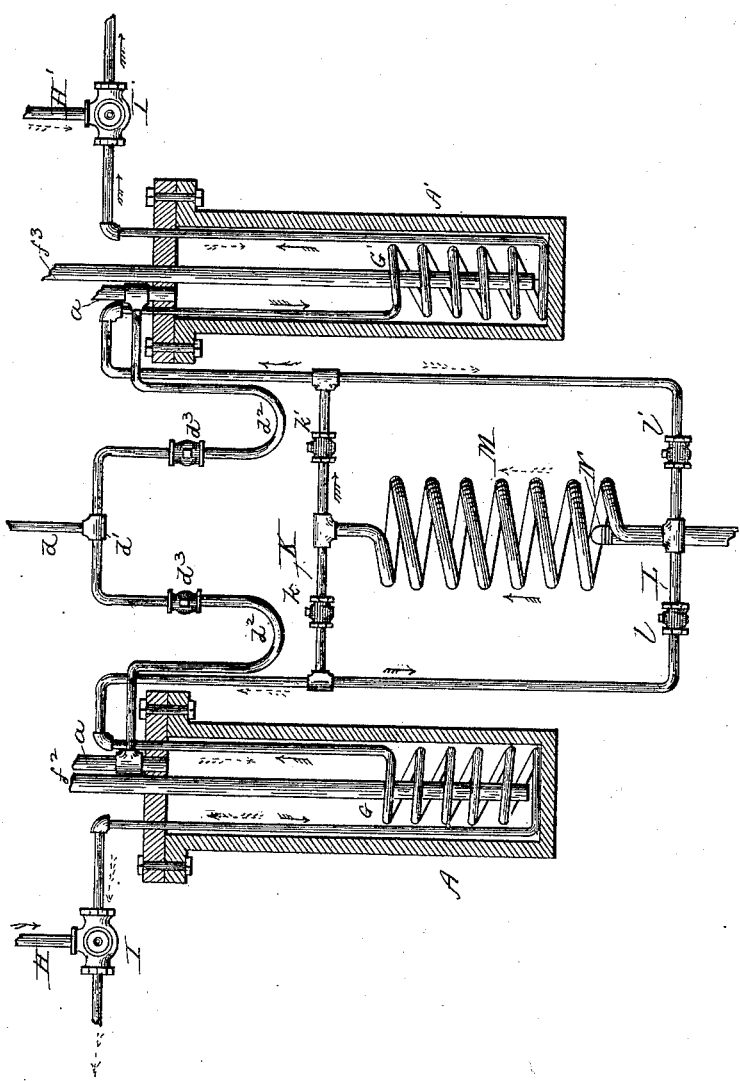
Witnesses.
Franklin H. Hough
G. M. Copenhaver.
Inventor
Jacob Erny
by Connolly Bro
attys

UNITED STATES PATENT OFFICE.

JACOB ERNY, OF PHILADELPHIA, PENNSYLVANIA, ASSIGNOR, BY DIRECT AND MESNE ASSIGNMENTS, TO THE INTERNATIONAL FREEZING AND REFRIGERATING MACHINE COMPANY, OF NEW JERSEY.

REFRIGERATING APPARATUS.

SPECIFICATION forming part of Letters Patent No. 462,118, dated October 27, 1891.

Application filed October 31, 1890. Serial No. 369,882. (No model.)

*To all whom it may concern:*

Be it known that I, JACOB ERNY, a citizen of the United States, residing at Philadelphia, in the county of Philadelphia and State of Pennsylvania, have invented certain new and useful Improvements in Refrigerating Apparatus; and I do hereby declare the following to be a full, clear, and exact description of the invention, reference being had to the accompanying drawings, which form part of this specification.

This invention has relation to an apparatus for refrigerating purposes and for the artificial production of ice, and has for its object the provision of novel means whereby in a freezing or refrigerating machine in which the refrigeration is produced by the expansion of a suitable gas the said gas, which may be ammoniacal gas, is liberated by heat from its aqueous solution, condensed by cold, liquefied by pressure, expanded so as to produce the requisite lowering of temperature for the refrigerating or freezing operation, and finally brought into contact with water, by which it is reabsorbed, such operation being continued until all or nearly all the gas has been transferred from the aqueous medium in which it was originally held in solution to the body of water in which it is absorbed after performing its function, whereupon the heat is transferred from the aqueous solution in which the gas was originally held to the solution in which it has been absorbed and a retransfer of the gas thereby effected through the same course which it took in the first instance, resulting in a continuous freezing or refrigerating operation.

In the accompanying drawings, illustrating my improved apparatus, by means of which my novel method of refrigerating is carried into effect, Figure 1 is a vertical longitudinal sectional view of the complete apparatus, and Fig. 2 a side elevation of a modification of the same.

A and A' designate two similar vessels made of extra heavy material—such as iron—and adapted to contain aqua-ammonia or other suitable solution. B designates a similarly-constructed vessel arranged in such relation to the vessels A A' that the bottom of the vessel B shall be elevated above the tops of the vessels A A', the latter being arranged at the same level one with the other. From the tops of the cylinders A A' pipes $a\,a$ lead and are joined at $a'$, and from thence lead upward and over the cylinder B and extend downward into the latter nearly to its bottom—say about nine-tenths of its length. Each of the pipes $a$ is provided with a check-valve $a^2$ and with a stop-cock $a^3$ and $a^4$, respectively, the purpose of which will be hereinafter described. A back-flow pipe $d$ leads from the cylinder B and branching at $d'$ leads to and connects with the pipes $a\,a$ just above the tops of the cylinders A A'. The branched portions of the pipe $d$ are each formed with a trap $d^2$ and a stop-cock $d^3$, and the upper end of said pipe passes through the bottom of the cylinder B and rises within said cylinder about one-fourth the length of the latter. From the top of the cylinder B a pipe $b$ leads outward and is formed into a coil or worm $b'$, which is contained within a cooling-vessel D, through which water is caused to flow from a suitable source of supply. The pipe constituting the coil or worm is continued so as to lead into the top of a cylinder C, made of metal and of sufficient strength to withstand the pressure of its expansible contents.

Between the coil $b'$ and the cylinder C the pipe $b^2$ leading from the former is furnished with a suitable check-valve $h$, which prevents a backflow of gas from the cylinder C to the coil.

E designates a suitable freezing-coil, which communicates with the cylinder C at the bottom of the latter through a pipe $i$, in which is a valve or cock $i'$. From the extremity of the freezing-coil E a pipe F proceeds to the vicinity of the cylinders A A', and is provided with a check-valve $k$, and, branching at F', leads by branches $F^2\,F^3$, which are provided with stop-cocks $f^2\,f^3$, to the tops of the cylinders A A' and down into the same nearly to the bottoms thereof. Within each of the vessels A A' is arranged a steam-coil, and suitable cocks on the pipes leading to the said steam-coils permit of steam being turned on either of the coils, as required.

The apparatus being constructed as described, and with the cylinder A partially filled with aqua-ammonia and the cylinder B charged with the same solution to about the level of the pipe $d$, the operation is as follows: The cylinder A being heated by means of the steam-coil G, the gas is liberated from the ammoniacal solution and passes through the pipe $a$ into cylinder B, the cock $a^3$ on branch of pipe $a$ leading to cylinder A being open, while the cock on the branch leading from cylinder A' is closed, and any moisture carried over with the gas is condensed and carried back through the pipe $d$ into the vessel A. The gas then passes from the cylinder B into and through the coil or worm $b'$, wherein it is condensed and liquefied, and from which it flows into the cylinder C, from which it expands continuously through the valve $i'$ into the freezing-coil E. When all or nearly all of the ammoniacal gas has been distilled from the cylinder A, the heat is turned off and the cylinder is allowed to cool. The valve $i'$ leading to the freezing-coil being kept open slightly, as above described, the contents of the cylinder C are gradually and slowly admitted to the freezing-coil E, wherein the liquefied ammonia expands and instantly reduces the temperature of the freezing-coil to a very low degree. From the freezing-coil the gas passes by way of the pipe F and the branch $F^3$ to the cylinder A', where it is absorbed by a body of cold water contained in said cylinder, the cock $f^2$ of branch $F^2$ being closed, so as to prevent the gas passing to cylinder A. After all or nearly all the gas has passed, as described, from the cylinder A through the freezing system to the cylinder A', and the cylinder A and its liquid contents having been allowed to cool, the cock $a^3$ is closed and the cock $a^4$ is opened and the cock $f^3$ is closed and the cock $f^2$ is opened. The steam is now turned onto the coil in cylinder A' and the operation proceeds as before, the course of the gas being the same through the condensing coils and chambers and the freezing-coils, as before, but the gas going now from the cylinder A' to the cylinder A. As often as required the transfer of the gas from one of the cylinders A A' to the other is effected in the described manner, and thus a practically continuous freezing operation is carried on.

While I have stated that after the gas has been caused to pass over from one of the evaporating-vessels A or A' to the other, the vessel from which the gas has been caused to pass by the application of heat is allowed to cool. I prefer to accelerate the cooling operation by the application of a cooling medium, such as cold water, and to accomplish this end I place upon each of the steam-pipes leading to the coils G G' a three-way cock or valve I, with a branch pipe H leading to a source of supply of cold water, such as an ordinary street-main, or to any other reservoir or vessel from which a supply of a suitable cooling medium may be obtained. By means of the three-way cock I and the supply-pipe H the contents of the vessels A A' are speedily and positively cooled, the cock being so constructed and arranged that as soon as the steam has been turned off the cold water or other cooling medium is caused to flow through the steam-coil G or G' in lieu of the steam.

In the modified apparatus shown in Fig. 2, instead of leading steam through the three-way cock on one side of the apparatus and water through the cock on the other side, I lead cold water through the cock and coil on one side of the apparatus, and, having heated the water by means of a heating-coil placed between the coils G G', lead it through the coil on the other side.

Referring to Fig. 2, the pipes leading from the coils G G' are connected together by cross branches K and L, the pipe K being provided with cocks $k$ $k'$ and the pipe L with cocks $l$ $l'$. A heating-coil M is connected to the pipes K and L between the cocks $k$ $k'$ and the cocks $l$ $l'$, and a gas-burner N or other suitable heating device is arranged so as to heat the coil M.

The operation of this part of my improvement is as follows: If, for instance, it is desired to cool the vessel A and simultaneously heat the vessel A', the cock I is turned so as to admit cold water to the coil G, the valves $k$ and $l'$ are closed, and the valves $l$ and $k'$ are opened. Cold water will now flow through coil G, and, following the course indicated by the full arrows, will ascend through coil M, where it is heated, and thence proceeds through coil G' and off through the horizontal branch pipe leading from three-way cock I'. When it is desired to reverse the operation and heat the vessel A and cool the vessel A', the cocks I', $l'$, and $k$ are opened and the cocks I, $k'$, and $l$ are closed. The cold water now flows through the three-way cock I', follows the course indicated by the dotted arrows, and cools. The coil G' is then heated while passing up through coil M, and, passing into and through the coil G, heats the vessel A and passes off through the horizontal branch of three-way cock I.

Having described my invention, I claim—

1. In an apparatus for cooling or refrigerating, the combination, with the vessel B, the cooling coil or worm $b'$, the liquid-storage vessel C, and the freezing-coil E, of the twin evaporating-vessels A A', each connected with the vessel B and to the freezing-coil E by pipes provided with suitable cocks, whereby vapor may be passed from either of the vessels A or A' to the other, following the same course through the freezing-coils, substantially as described.

2. In an apparatus for cooling or refrigerating, the combination of the twin evaporating-vessels A A', the coils G G', contained in said vessels, and steam and water pipes connected to said coils, with the drying-vessel B, the condensing-coil $b'$, connected therewith, the liquid-storage vessel C, connected to said condensing-coil, the freezing-coil E, connected to said liquid-storage vessel, and suitable pipes provided with cocks or valves and connecting each of the said twin evaporating-vessels with both the drying-cylinder and the freezing-coil, substantially as described.

3. In a refrigerating apparatus, the combination, with a condensing-coil, a vessel in which anhydrous ammonia is stored under pressure, and a conduit for expanded ammonia in communication with said vessel, of a branched pipe leading from said conduit, twin generators connected to the branches of said pipe, means for alternately heating and cooling each of said generators, a branched pipe leading from said generators to the condensing-coil, and a pipe connecting the latter with the vessel in which the ammonia is stored, all constructed and arranged substantially as described.

In testimony that I claim the foregoing I have hereunto set my hand this 2d day of October, 1890.

JACOB ERNY.

Witnesses:
H. E. GARSED,
W. E. PARISH.